July 18, 1967   A. A. JACOBELLIS   3,331,117
METHOD OF MANUFACTURING A JACKETED SPACED-WALL ACCUMULATOR
Original Filed July 14, 1964
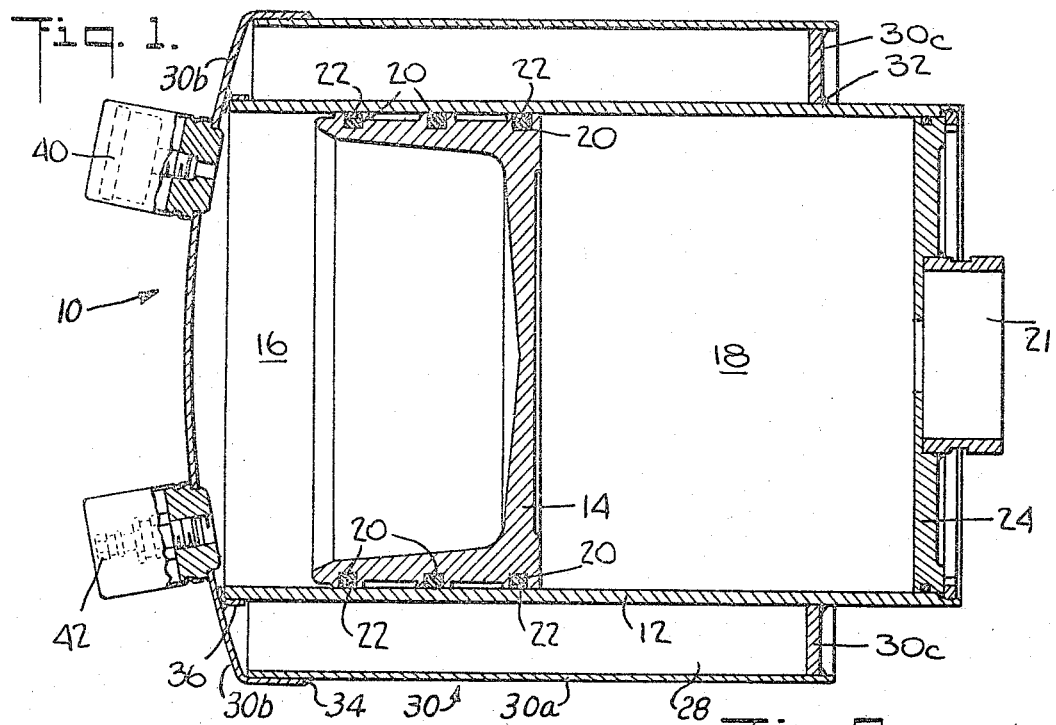
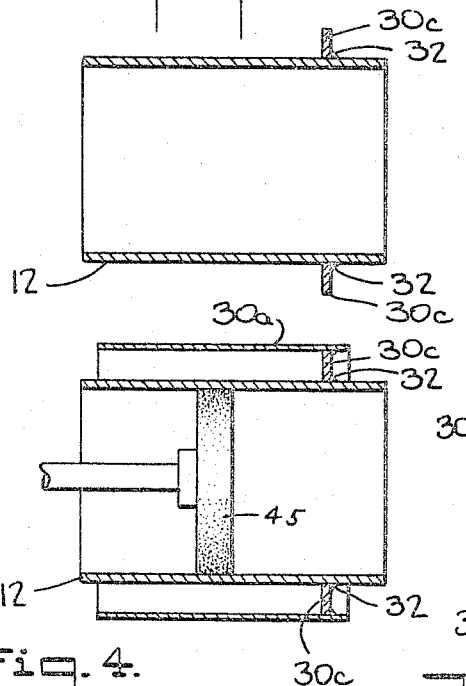
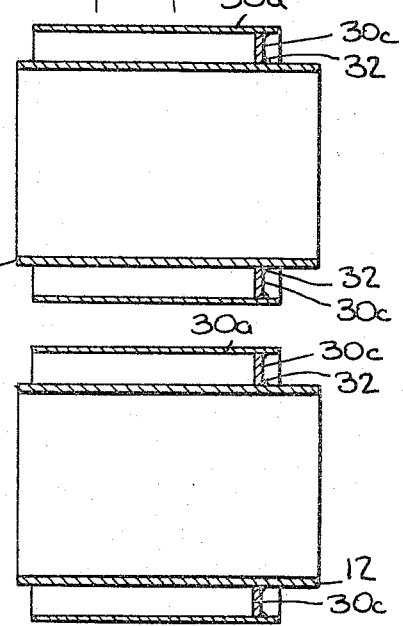
INVENTOR.
ALPHONSE A. JACOBELLIS
BY
Kenyon & Kenyon
ATTORNEYS

United States Patent Office 3,331,117
Patented July 18, 1967

3,331,117
METHOD OF MANUFACTURING A JACKETED SPACED-WALL ACCUMULATOR
Alphonse A. Jacobellis, 7 New Dorp Place,
Huntington Station, N.Y. 11746
Continuation of application Ser. No. 382,571, July 14, 1964. This application Apr. 4, 1966, Ser. No. 540,103
2 Claims. (Cl. 29—157)

This invention relates in general to a method of manufacturing piston type pressure accumulators and more particularly to a method of manufacturing a jacketed accumulator.

This application is a continuation of application Ser. No. 382,571 filed July 14, 1964, now abandoned, and entitled, "Piston Accumulator and Method of Manufacture," which is a continuation-in-part of my co-pending application, Ser. No. 214,746 filed on Aug. 3, 1962, now abandoned, and entitled, "Piston Accumulator." The jacketed piston accumulator is one in which the gas chamber is in communication with an annular chamber that surrounds the main cylinder. By this means, the volume of the gas chamber is greatly increased without increasing the overall length of the accumulator. Thus for a given capacity a shorter accumulator may be designed. In many applications, such as in mobile equipment, there are equipment limitations on the length of the accumulator that may be employed. A jacketed accumulator provides the advantage of permitting a greater capacity than could otherwise be obtained where these length limitations obtain.

The jacketed accumulator poses a serious fabrication problem. The inside of the inner cylinder must be honed to very close tolerances so that a close fit between the piston and cylinder may be obtained and leakage avoided. The annular jacket around the inner cylinder must be welded to the inner cylinder in order to seal off the jacket from the atmosphere. The heat generated by the welding operation causes a distortion of the inner cylinder and thus would undo the close tolerances obtained during honing. Accordingly, the inner cylinder must be honed after the jacket has been welded to the inner cylinder. But, if the jacket has been welded to the inner cylinder prior to the honing, the end piece section of the jacket creates a dead end at the gas chamber end of the inner cylinder (where the inner cylinder communicates with the chamber defined by the jacket and outer surface of the inner cylinder). Because of this dead end, the subsequent honing step becomes very difficult and expensive since it is not possible to hone straight through as one would with a cylinder open at both ends.

Accordingly, it is a major purpose of this invention to devise a method for manufacturing a jacketed accumulator that will avoid the necessity of having to hone to a dead end.

In brief, the method of this invention accepts the necessity of having to hone subsequent to welding the jacket to the inner cylinder. According to this invention, an end piece is provided for the jacket which can be welded to the jacket (not to the inner cylinder) after the honing operation. Thus the jacket may be welded to the inner cylinder without the jacket end piece being attached so that the inner cylinder is open at both ends. The inner cylinder is then honed all the way through. The end piece is then welded to the jacket and, because it is welded to the jacket, is welded at a position sufficiently removed from the inner cylinder so that the heat of the welding does not cause the inner cylinder to distort or go out of round.

Other purposes and objects of this invention will be apparent from the following drawings and detailed descriptions, in which:

FIG. 1 is a cross-sectional view along the main axis of the accumulator of this invention;

FIG. 2 illustrates the intermediate product after a first step in assembling the accumulator of FIG. 1;

FIG. 3 illustrates an intermediate product after a second assembly step;

FIG. 4 illustrates an intermediate product after a third assembly step; and

FIG. 5 is an exploded view just prior to the last assembly step which provides the product of FIG. 1.

With reference to FIG. 1, the accumulator 10 of this invention has an inner cylinder 12 which has been honed to close tolerances so that a piston 14 will ride within the cylinder 12 and maintain an effective seal between the gas chamber 16 and oil chamber 18. Various O-rings 20 and Teflon sealing rings 22 perform the function of sealing the two chambers 16 and 18 from each other while permitting the piston 14 to ride along the cylinder 12 in response to pressure on the piston 14.

A conventional end cap 24 is illustrated at the end of the liquid chamber 18. The end cap 24 is fastened to the cylinder 12 by conventional fastening means. An opening 21 in the end cap 24 permits communication between the liquid chamber 18 and the outside of the accumulator 10. Normally the opening 26 is fastened to a connection to a line carrying liquid under pressure and the liquid under pressure thus backs into the liquid chamber 18 to supply the pressure on one face of the piston 14.

The gas chamber 16 is the main gas chamber in that it communicates to a secondary gas chamber 28, which secondary gas chamber 28 is formed by the space between the jacket 30 and the inner cylinder 12. The jacket 30 is a bowl-shaped member which is welded at its front end along line 32 to the cylinder 12.

The jacket 30 is formed of two pieces which are welded together as one of the last steps in the fabrication of the accumulator 10 of this invention. These two main jacket sections 30 are the cylindrical section 30a and the rear section 30b. The rear section 30b is welded to the cylindrical section 30a along the line 34. It is essential to the manufacture of an economical jacketed piston accumulator that the rear section 30b and the wall section 30a be separate sections which are welded together during fabrication.

For ease of assembly and fabrication, the jacket 30 has a front wall 30c which is welded during fabrication to the cylindrical section 30a but it is not essential to this invention that the front wall 30c was originally separate from the cylindrical wall 30a.

Small L-shaped supports 36 position the inner cylinder 12 within the jacket 30. At least three supports 36 must be used. The one-eighth inch or so of spacing between the end of the inner cylinder 12 and the end cap 24 that is created by the supports 36 is sufficient to establish communication between the main gas chamber 16 and the secondary gas chamber 28.

Seals 40 and 42 of a conventional sort, are illustrated in the rear cap section 30b. These seals 40, 42 are to provide a safety valve and also to permit opening ports in the rear cap section 30b for the purpose of maintenance and cleaning. These seals 40, 42 are conventional in nature and are illustrated here solely to provide a complete embodiment of the invention.

The jacketed accumulator 10 just described permits the method of fabrication of this invention to be employed. During construction, the plate portion 30c is welded to the inner cylinder 12 along the line 32 to provide the intermediate product illustrated in FIG. 2. The next step in fabrication involves welding the cylindrical portion 30a of the jacket 30 to the plate portion 30c to produce the intermediate product illustrated in FIG. 3.

At this point in the fabrication, the inner cylinder 12 is completely open at both ends. Thus, the next step in fabrication is to hone the inside wall of the cylinder 12 to the desired accurate dimension and smoothness. A stone honing device 45, as illustrated in FIG. 4, may be employed during this step of fabrication. Because the cylinder 12 is open at both ends, the honing can be made straight through and there is no problem of honing to a dead end.

After the inner cylinder 12 has been honed, the jacket end cap 30b is positioned on the inner cylinder 12 and outer cylinder 30a. The jacket end cap 30b has previously had the L-shaped supports 36 welded to it so that the supports 36 will engage the cylinder 12 and assist in this positioning. The jacket end cap 30b is then welded along the line 34 to the outer cylinder 30a thus completing the fabrication steps which constitute the subject matter of this invention.

Further fabricating steps are necessary to complete the entire accumulator 10 and these steps include assembling the piston 14 with its O-rings 20 and seals 22 inside the inner cylinder 12. The end cap 24 must also be assembled in place as well as must be seals 40 and 42.

The sequence of fabricating steps may be varied somewhat depending upon manufacturing convenience. Thus the welding of the jacket cylinder portion 30a to the front plate portion 30c may precede the welding of the front plate portion 30c to the inner cylinder 12. However, what is essential to the method of this invention is that the welding along the line 32 precede the honing and that the jacket end cap 30b be welded into place after the honing.

The invention has been described in connection with the details of a specific embodiment. Thus there are many variations in the embodiment which may be employed by one skilled in this art without departing from the scope of the invention. It is to be understood that the following claims are to be given a scope commensurate with the invention.

For example, the jacket portions 30a and 30c may be fabricated as a single integral piece which is welded to the inner cylinder 12 prior to honing.

What is claimed is:
1. The method of manufacturing a jacketed spaced-wall accumulator comprising the steps of:
    (a) welding the front end of a cylindrical jacket section to the outer wall of an inner cylinder to form an annular chamber between said cylindrical jacket section and said inner cylinder,
    (b) then honing through the entire inner surface of said inner cylinder, and
    (c) subsequently welding a rear cap to the rear end of said cylindrical jacket section at a location spaced from said inner cylinder,
    whereby the heat of said welding of said rear cap to said cylindrical jacket section will not be directly applied to said inner cylinder and thus will be insufficient to cause a distortion of the honed inner surface of said inner cylinder.

2. The method of manufacturing a jacketed spaced-wall accumulator comprising the steps of:
    (a) welding the front end of a cylindrical jacket section to the outer wall of an inner cylinder to form an annular chamber between said cylindrical section and said inner cylinder,
    (b) then honing through the entire inner surface of said inner cylinder, and
    (c) subsequently welding a rear cap to the rear end of said cylindrical jacket section at a location spaced from said inner cylinder, said rear cap being spaced from the rear end of said inner cylinder to provide communication between said annular chamber and the interior of said inner cylinder,
    whereby the heat of said welding of said rear cap to said cylindrical jacket section will not be directly applied to said inner cylinder and thus will be insufficient to cause a distortion of the honed inner surface of said inner cylinder.

References Cited
UNITED STATES PATENTS

| | | | |
|---|---|---|---|
| 1,629,427 | 5/1927 | Whitworth | 29—445 |
| 1,808,442 | 6/1931 | Weide. | |
| 2,216,987 | 10/1940 | Rose | 29—156.4 |
| 2,417,873 | 3/1947 | Huber | 138—31 |
| 2,560,023 | 7/1951 | Workman | 29—445 X |
| 2,703,108 | 3/1955 | McCuistion | 138—31 |
| 2,775,255 | 12/1956 | Snyder | 138—31 X |
| 3,001,268 | 9/1961 | Greer | 29—157 |

FOREIGN PATENTS

| | | |
|---|---|---|
| 956,394 | 8/1949 | France. |

CHARLIE T. MOON, *Primary Examiner.*